United States Patent Office 2,924,027
Patented Feb. 9, 1960

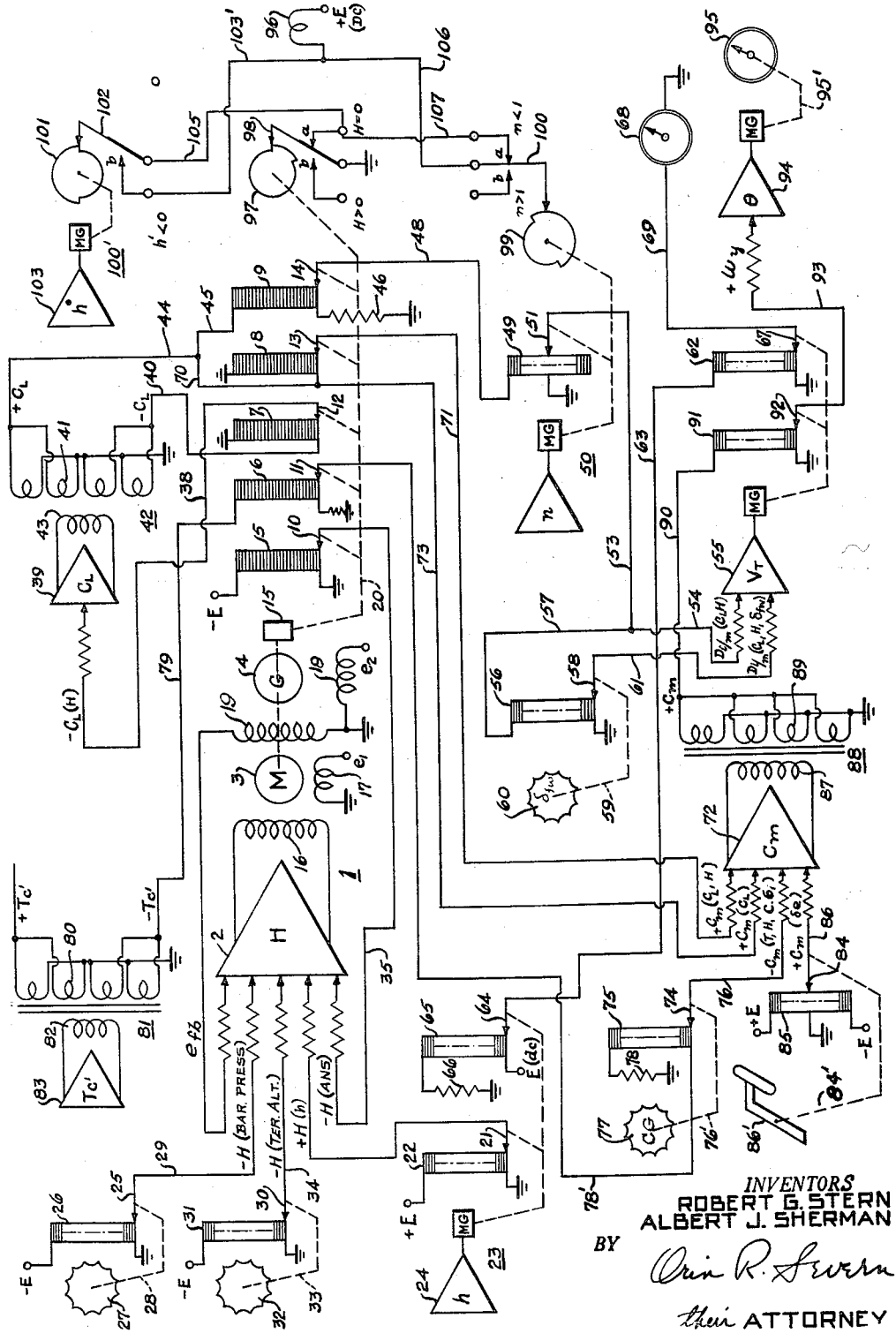

2,924,027

FLIGHT TRAINING APPARATUS FOR SIMULATING LOW LEVEL FLIGHT

Robert G. Stern, West Caldwell, and Albert J. Sherman, Morris Plains, N.J., assignors to Curtiss-Wright Corporation, a corporation of Delaware Application April 21, 1955, Serial No. 502,872

6 Claims. (Cl. 35—12)

Our invention relates to aircraft training apparatus and particularly to training apparatus adapted for realistically simulating low level flight of an aircraft.

The present invention is directed to improvements of the flight computing system disclosed in our copending application Ser. No. 436,532, filed June 14, 1954, now Patent No. 2,858,623, granted on November 4, 1958.

Ground aircraft training apparatus for simulating the operation of aircraft instruments taking into account various aerodynamic factors affecting the flight on an aircraft is well-known. As shown in the copending application of Robert G. Stern for Aircraft Training Apparatus for Simulating Landing and Related Maneuvers S.N. 134,623 filed December 23, 1949, now Patent No. 2,731,737 granted January 24, 1956, such apparatus may include ground sensing means to distinguish between simulated ground and airborne conditions and effectively control the flight indicating instruments to provide appropriate indications. In general however no means have heretofore been provided for taking into account special aerodynamic factors affecting the flight of an aircraft close to the ground as for example when the aircraft is approaching the runway for a landing or for starting to climb from the runway when taking off. The factors affecting flight near the ground include a decrease in induced drag resulting in increased airspeed, and an increase in longitudinal stability resulting in increased elevator requirements.

It is a prime object of this invention to provide in ground aircraft training equipment apparatus for reliably simulating flight conditions close to the ground.

The invention will be more fully set forth in the following description referring to the accompanying drawing and the features of novelty will be pointed out with particularity in the claims annexed to and forming a part of this specification.

The drawing is a schematic illustration of apparatus embodying the features of this invention.

In accordance with this invention, we provide an H servo 1 for computing the above-ground-height of a simulated aircraft when flying close to the ground. The H servo is operative between positions respectively representing the aircraft to be on the ground and at some predetermined altitude of flight as for example 200 ft. above the runway. The H servo is typical of other servo systems shown in the drawing. Referring to the H servo as an example of the various servo systems, such servo includes a servo amplifier 2 to which are applied a number of controlled voltages hereinafter referred to in detail, a motor 3 responsive to the amplifier output, a feedback generator 4 driven by the motor 3, and a number of potentiometers as for example 5, 6, 7, 8 and 9 having slider contacts 10, 11, 12, 13 and 14 respectively which are connected through a gear reduction box 15 to the motor generator combination. Servo amplifier 2 is a summing amplifier for determining the resultant of the input voltages and is of a well-known type in the art for algebraically summing a plurality of A.C. voltages of varying magnitude and polarity. A detailed circuit illustration of the servo amplifier is therefore unnecessary.

As indicated, the output of the amplifier is used to control a servo network including a motor-generator set which is shown in some detail for the H servo, but is diagrammatically illustrated and designated as M.G. for simplicity in other parts of the drawing. The servo motor 3 is of the two phase type having a controlled phase 16 which is energized by the amplifier output, and another phase 17 which is energized by a constant magnitude A.C. voltage $e_1$ de-phased 90° from the control voltage. The operation of this type of motor is well-known, rotation being in one direction when the phase difference between control and reference voltages is +90°, and in the opposite direction when said phase difference is —90°, the rate of rotation in both cases depending upon the magnitude of the control voltage. Generator 4 which is driven by the servomotor is a two-phase generator having one phase 18 energized by a 90° de-phased A.C. reference voltage $e_2$, the other phase 19 generating according to the motor speed a feedback voltage $e_{fb}$ for purposes of velocity control.

The resistance elements of the potentiomters 5, 6, 7, 8 and 9 of the H servo and of the other potentiometers shown in the drawing may be of the well-known card type and are of circular band form in practice but are diagrammatically illustrated in plane development for clarity. A structural arrangement that may be used for a servomotor and potentiometer combination of the character above referred to is shown in Patent No. 2,341,749 issued December 2, 1947 to R. G. Grant for "Potentiometer Housing and Positioning Structure."

The slider contacts 10, 11, 12, 13 and 14 of potentiometer cards 5, 6, 7, 8 and 9 respectively are positioned along the cards by the servomotor 3 which connects with the slider contacts through gear reduction box 15 and suitable mechanical connections 20. The slider contacts derive, i.e. pick off potentiometer voltages depending on the respective contact position. Each potentiometer for the various servos shown in the drawing has one or more voltages impressed between its terminals and ground, and is shaped or contoured so that the derived voltage at the protentiometer slider contact bears a certain relationship to linear movement of such slider contact depending on the particular functional construction of the potentiometer.

The H servo computes tape-line altitude i.e. actual height above the ground according to the magnitude of control voltages representing sea-level barometric pressure, terrain altitude and pressure altitude determined as a function of vertical airspeed. As indicated in the drawing, the various input signals to the amplifier 2 of the H servo are —H (Bar. Press.), —H (Ter. Alt.), +H($h$) and an answer signal —H (Ans.). The input signal +H($h$) represents altitude determined according to vertical airspeed. This signal is derived at slider contact 21 of potentiometer 22 which is energized at the one end by the A.C. voltage +E, and is grounded at the other end. Potentiometer 22 is included in the $h$ servo 23 which also includes the servo amplifier 24 having various input signals causing slider contact 21 to be positioned on the potentiometer card 22 such that a voltage is derived at contact 21 providing a signal for the amplifier 2 of the H servo representing altitude according to vertical airspeed. The inputs to the $h$ servo 23 for computing altitude as a function of vertical airspeed may be obtained in the manner shown in the aforementioned Patent No. 2,731,737.

The two inputs to the amplifier 2 of the H servo namely, —H (Bar. Press.) and —H (Ter. Alt.) are correction factors which respectively take into account sea-level barometric pressure and terrain altitude at a supposed air strip to provide for the accurate computation by the H servo of height above such airstrip. The signal —H (Bar. Press.) which represents the effect of barometric pressure at sea-level is derived according to the position of the slider contact 25 on potentiometer card 26 which as shown is energized at one end by the A.C. voltage —E and is grounded at its other end. The slider contact 25 is positioned on the card 26 by the dial 27 through connection 28. The dial is under the control of an instructor and a voltage is derived at the slider contact according to the dial's position and fed over the line 29 to amplifier 2 to provide the signal —H (Bar. Press.). The signal —H (Ter. Alt.) to amplifier 2 is derived in accordance with the position of slider contact 30 on potentiometer card 31. Slider contact 30 may be positioned on the card which connects at opposite ends with the A.C. voltage —E and ground respectively by an instructor by means of a dial 32 connecting with the slider contact 30 through mechanical connection 33. The voltage derived at contact 30 is fed over line 34 to provide the signal —H (Ter. Alt.) to amplifier 2. The answer signal —H (Ans.) for amplifier 2 is fed over the line 35 from the slider contact 10 of the servo answer card 5 having one end connected with the A.C. supply voltage —E and the other end connected to ground. As hereinbefore stated the H servo is operative within a predetermined range of which the upper limit represents a selected above-ground-height as for example 200 ft. This may be accomplished by causing the servo to run against a stop at a point representative of the 200 ft. mark with a slip clutch provided to brake the motor to rest after the stop is encountered. Within the select range the H servo correctly computes height of the aircraft above the airstrip. For simulated flight above 200 ft. the slider contacts of the various potentiometer cards on the H servo are positioned at the upper ends of the cards as they are shown in the drawing.

Low level flight as for example within the altitude range computed by the H servo has various effects and suitable apparatus is provided to simulate the more significant ones. Apparatus for computing the effect on airspeed of low level flight is provided and such apparatus includes potentiometer 7 of the H servo which as shown has its slider contact 12 connected over line 38 to summing amplifier 39 to provide an input signal —$C_L$ (H). The amplifier 39 computes coefficient of lift and is provided with various input signals such as shown for example in our aforementioned Patent No. 2,858,623 in addition to the input signal —$C_L$ (H). However, the signal —$C_L$ (H) which is determined according to the position of slider contact 12 on card 7 takes into account the effect on coefficient of lift of low level flight, such effect being an increase in the coefficient of lift due to the suppression of wing downwash by the presence of the ground plane. This effect is of increasing importance as the plane flies lower and lower to the ground. As shown card No. 7 is energized over line 40 at one end by the voltage —$C_L$ derived from the lower terminal of the secondary winding 41 of the transformer 42 having its primary winding 43 connected to amplifier 39. Said one end corresponds to an on-ground position for a simulated aircraft and the voltage —$C_L$ represents the coefficient of lift. The other end of the card connects to ground and corresponds to an above-ground-height of 200 feet.

The upper terminal of secondary winding 41 having output voltage +$C_L$ connects over line 44 and lead 45 with an end of card 9 which end corresponds to the 200 ft. mark. The other end of the card connects through resistor 46 to ground. Potentiometer card 9 includes slider contact 14 which is positioned along the card according to the operation of the H servo for deriving a voltage which is fed over the line 48 to one end of a potentiometer card 49 included in the normal acceleration servo 50. The voltage derived at slider contact 14 and fed to the potentiometer card 49 takes account of the effect of low level flight on induced drag according to the particular above-the-ground height computed by the H servo. Low level flight results in a decrease in induced drag and such decrease in induced drag tends to cause an increase in airspeed. As shown potentiometer card 49 is grounded at its mid-point and includes a slider contact 51 which is moved to either side of said grounded point by the $n$ servo to a position in accordance with its input signals which may be determined in the manner shown in our aforementioned Patent No. 2,858,623. Slider contact 51 connects over lines 53 and 54 with the servo amplifier 55 of the $V_T$ servo for computing true airspeed to provide an input signal $$\frac{+Di}{m}(C_L, H)$$

representing the effect of induced drag on airspeed, such input reflecting a reduction in induced drag in close proximity to the ground according to the position of slider contact 14 on potentiometer card 9 as determined by the H servo. For the purpose of taking into account the effect of wingflap position on the computation of induced drag a potentiometer 56 is provided which connects at one end over line 57 with the line 53, the other end being grounded. Potentiometer 56 includes slider contact 58 which is positionable through connection 59 by a simulated flap control 60, a voltage being derived at the slider contact and fed over line 61 to the amplifier 55 providing the input $$\frac{+Di}{m}(C_L, H, S_{fw})$$

representing the effect of the flap position. The other inputs to our $V_T$ servo may be as shown in the aforementioned Patent No. 2,858,623.

The $V_T$ servo includes potentiometer card 62 having one end grounded and the other end connected over line 63 to a slider contact 64 of a potentiometer 65 which is included in the $h$ servo 23. Potentiometer 65 connects at one end to the DC supply voltage +E(D.C.) and connects through resistor 66 at its other end to ground. In this way the potentiometer 62 is provided with a voltage derived at slider contact 64 representing the square root of the air-density ratio during flight. Slider contact 67 of the potentiometer 62 is positioned on the card in accordance with the operation of the $V_T$ servo to derive a signal which is used to operate the airspeed indicator 68 connected at opposite terminals to slider contact 67 over line 69 and to ground respectively.

Suitable means are also provided for simulating the effect of low level flight on the pitch of a simulated aircraft. Such means include the potentiometer card 8 which as shown connects at one end to ground and at its other end over lines 44 and 70 with the lower terminal of the secondary winding 41 of transformer 42. The slider contact 13 derives a voltage according to its position on the card which voltage is fed over line 71 to the summing amplifier 72 for determining the moment coefficient $C_m$ of the simulated aircraft. In accordance with the position of slider contact 13 on card 8 summing amplifier 72 is provided with a signal +$C_m$ ($C_L$, H) representing one effect of low level flight on the moment coefficient. This effect reflects an increase in stability of the simulated aircraft near the ground due to the fact that the downwash effect on the tail of air flowing over a wing is counteracted, when the plane is in close proximity to the ground, by interference of the ground plane. As shown, the upper terminal of the secondary winding 41 of transformer 42 also connects over lines 44, 70 and 73 with the summing amplifier 72 to provide the input signal +$C_m$ ($C_L$) representing the moment coefficient $C_m$ as a function of the lift coefficient $C_L$.

Additional inputs to the $C_m$ amplifier 72 include input signals $-C_m$ (T, H, C.G.) and $+C_m$ ($S_e$). The input signal $-C_m$ (T, H, C.G.) takes account of the effect of flight near the ground on the pitching moment which is determined by thrust referred to the position of the center of gravity of the aircraft. As shown this input signal is derived at slider contact 74 of the center of potentiometer 75, the slider contact 74 connecting with the $C_m$ amplifier over line 76. Contact 74 is positionable through connection 76' by dial 77 under the control of an instructor according to a supposed loading condition for the simulated aircraft. Potentiometer 75 connects to ground at one end through resistor 78 and connects at its other end over line 78' with the slider contact 11 of the potentiometer 6 having one end grounded and the other end connected over line 79 to the lower output terminal of the secondary winding 80 of a transformer 81 which has its primary winding 82 energized by the output of amplifier 83 for determining the thrust coefficient $T_c'$. The amplifier 83 may be energized in the manner shown in our aforementioned Patent No. 2,858,623. The input $-C_m$ ($S_e$) to the amplifier 72 is derived according to the position of the slider contact 84 on the potentiometer card 85, the slider contact 84 connecting with the $C_m$ amplifier 72 over line 86. Slider contact 84 is positionable on the card by the simulated elevator control 86' which is connected thereto by means of mechanical connections 84'. As shown the card 85 is grounded at the mid-point and connects at opposite ends to the positive and negative A.C. supply voltages $+E$ and $-E$ respectively.

The $C_m$ amplifier 72 connects with the primary winding 87 of a transformer 88 having a secondary winding 89 which provides the output signal $+C_m$ representing the moment coefficient which signal is fed over the line 90 to one end of the potentiometer 91 having the other end grounded. The potentiometer 91 includes the slider contact 92 which is positioned on the potentiometer card according to the operation of the true airspeed servo $V_T$. Slider contact 92 connects over line 93 with the servo amplifier 94 of the pitch servo $\theta$ to provide an input signal $+\omega_y$ representing the rate of pitch of the simulated aircraft. The pitch servo is an integrating servo and functions thus in joint response to the true air speed computing servo 55 and the moment coefficient computer 72, to compute pitch of the aircraft at any particular time which is registered on an indicator 95 connected with the servo mechanism by connections 95'. The described apparatus provides a pitch indication which realistically simulates actual pitch for corresponding movements of the elevator control in the simulated aircraft and simulator although the supposed flight is close to the ground. Because of the factors affecting pitch in low level flight pitch changes as registered on the instrument 95 are less sensitive to a movement of the elevator control when the supposed flight of the simulator is close to the ground than when it is at some considerable distance above the ground.

It is to be noted that the coefficient of lift as computed by the amplifier 39, and true airspeed as computed by the servo 55 are either directly or indirectly continuously variable functions of sea level altitude as computed by the $h$ servo 23; this may be readily seen by reference to our aforementioned Patent No. 2,858,-623. Moment coefficient as computed by the amplifier 72 is likewise a function of computed sea level altitude because its input signal $+C_m(C_L)$ is derived from the $C_L$ amplifier 39. Further its input signal $+C_m(\delta_e)$ is in accordance with the position of the elevator control 86', which is also determinative of sea level altitude as likewise shown in our aforesaid application. The computation by units 39, 55 and 72 is continuously variable as the function of sea level altitude over the entire contemplated range of operation of the $h$ servo 23. These three units however receive corrective signals as a function of computed height above ground in accordance with the operation of the H servo 1 as described at length herein, and the H servo 1 is of course also controlled by the $h$ servo as described. Since the servo 1 is limited in its operation at a level of 200 feet, as the simulated flight rises above 200 feet, the corrective signals are limited to their values corresponding to 200 feet above ground. For example, in the case of the corrective signal to the $C_L$ amplifier 39 the limit for the corrective signal at 200 feet is zero, in view of the grounding of the upper end of the potentiometer 7.

Suitable ground sensing means may be provided to control the operation of an H relay 96 for detecting when the simulator in its supposed flight touches the ground. The relay 96 corresponds to the relay 118 in the aforementioned Patent No. 2,731,737 and is provided to control servo operation so as to effect accurate simulation when the simulated aircraft is supposedly on the ground. One way in which this may be accomplished is shown in said Patent No. 2,731,737. We propose that the relay be controlled according to the operation of cams which are respectively actuated by the H servo, the $n$ servo, and a rate of climb servo $\dot{h}$. As shown the H servo includes the cam 97 which controls the operation of contact arm 98 for opening and closing the contacts 98a and 98b respectively. The normal acceleration servo 50 includes cam 99 which controls the operation of contact arm 100 for opening and closing the contacts 100a and 100b, and the $\dot{h}$ servo 100' includes the cam 101 for controlling contact arm 102 for positioning the contact 102b. The $\dot{h}$ servo is a rate of climb servo and includes the servo amplifier 103 having inputs thereto such as shown for example in the aforementioned Patent No. 2,731,737.

It will be apparent that whenever the simulated aircraft is "off the ground" the H relay 96 is de-energized since the contact 98a is open for any position of the H servo other than a position corresponding to zero altitude, and an energizing circuit for the H relay cannot be completed except over contact 98a. If the simulated aircraft is flown to effect a landing the $\dot{h}$ servo which computes rate of climb is positioned to indicate descent and the cam operated contact 102b is closed. When the H servo attains a zero position indicating that the aircraft has touched the ground the contact 98b opens and contact 98a closes causing relay 96 to be picked up over the energizing circuit which extends from the positive D.C. supply voltage $+E$ (D.C.) through the relay coil over line 103, contact 102b, line 105 and contact 98a to ground. A short period of time after the H relay picks up, the $\dot{h}$ servo attains a zero position indicating zero rate of climb and contact 102b opens. The H relay 96, however, remains energized over the circuit extending from the voltage source $+E$ (D.C.) over the relay coil, line 106, contact 100a, line 107, and contact 98a to ground, provided the normal acceleration on the ground is less than 1 and the position of the $n$ servo is such that contact 100a is closed. On take-off however normal acceleration is greater than 1 and the position of the $n$ servo is positioned such that contact 100a opens the contact 100b closes. The energizing circuit for the H relay 96 is opened at contact 100a and the H relay drops out. The H servo is thereafter operated according to its input signals away from the zero altitude position and the contact 98a opens and 98b closes. The relay 96 thus is energized if and only if the simulated altitude is zero, and if either the simulated rate of climb is less than zero or the simulated rate of climb is not less than zero but the normal acceleration is less than 1.

Summarizing the operation of the ground sensing system, the take-off operation is simulated under the following conditions: initially the H switch is closed by cam 97 at contact 98a and the $\dot{h}$ switch is positioned by cam 101 at contact 102a to represent "on-ground" position. The air-borne condition at take-off is represented when $n$ is greater than unity. Thus, de-energization of the H relay to simulate take-off is accomplished simply by opening the $n$ switch which operation represents sufficient lift to make the craft air-borne.

The landing operation is simulated by positioning of the H cam 97 at the zero position at "touchdown" to close the ground circuit switch at contact 98$a$, and by closing of the $\dot{h}$ cam switch at contact 102$b$, thereby representing negative rate of climb. Therefore for these conditions, the H relay 96 on landing may be energized to represent the "on-ground" position independently of the $n$ servo. If during landing, "flaring" of the aircraft is simulated the rate of climb momentarily may be zero, or possibly greater than zero, so that the $\dot{h}$ switch is positioned at contact 102$a$. However, in the case of "flaring" $n$ is greater than unity so that the $n$ switch is open on dead contact 100$b$ and the H relay remains de-energized to simulate the air-borne condition. The actual touchdown is simulated when $\dot{h}$ again becomes less than zero and H equals zero. Thus, a "bouncing" landing following a simulated "flare" may be simulated, where $n$ is momentarily greater than unity.

It should be understood that this invention is not limited to specific details of construction and arrangement thereof herein illustrated, and that changes and modifications may occur to one skilled in the art without departing from the spirit of the invention.

What is claimed is:

1. In grounded aircraft training apparatus having flight computing means responsive to signals reflecting the operation of instructor's controls and simulated flight controls, said apparatus including means for accurately computing height of the simulated flight above ground in close proximity to the ground, the combination comprising means for deriving from said height computing means control signals representing the effect of low level flight on true airspeed, true airspeed computing means responsive to said control signals, an indicator operatively connected to said true airspeed computing means for registering indicated airspeed, means for deriving from said height computing means control signals representing the effect of low level flight on moment coefficient, moment coefficient computing means responsive in part to said control signals representing the effect of low level flight on moment coefficient, pitch computing means responsive jointly to the true airspeed and moment coefficient computing means, and an indicator operatively connected to said pitch computing means for registering pitch.

2. In grounded aircraft training apparatus having flight computing means responsive to signals reflecting the operation of instructor's controls and simulated flight controls, said apparatus including means for accurately computing height of the simulated flight above ground in close proximity to the ground, the combination comprising means for deriving from said height computing means control signals reflecting changes in induced drag in close proximity to the ground, true airspeed computing means responsive to said control signals, an indicator operatively connected to the true airspeed computing means for registering indicated airspeed, means for deriving from said height computing means control signals representing the effect of low level flight on moment coefficient, moment coefficient computing means responsive in part to said control signals representing the effect of low level flight on moment coefficient, pitch computing means responsive jointly to the true airspeed and moment coefficient computing means, and an indicator operatively connected to said pitch computing means for registering pitch.

3. In an aircraft trainer having a plurality of simulated controls operable by an instructor and a student pilot, function generating means associated with each of said controls for producing an electrical signal as a function of the position of the associated control, a plurality of electrical computing systems producing output signals as functions of input signals respectively applied thereto and derived from others of said systems and from said function generating means for computing plurality of aerodynamic factors determinative of the simulated flight, one of said systems being effective to compute sea level altitude of said flight, a second of said systems being effective to compute height of said flight above ground, and a further system for computing an aerodynamic factor as a function of an input signal that is in effect a continuously variable function of said computed sea level altitude: the improvement comprising function generating means for producing as a function of said computed height above ground an electrical signal representative of the height of the simulated flight above ground, means to apply the latter signal to an input of said further system thereby to incorporate in the computation by said further system a correction factor to correct for an effect due to close proximity of said flight to ground, and means responsive to said height above ground-computing system having computed a predetermined height above ground for limiting the effect of said corrective signal at such predetermined height, whereby low level flight may be realistically simulated.

4. The combination as defined in claim 3 wherein the further system is a coefficient of lift computer.

5. The combination as defined in claim 3 wherein the further system is a true air speed computer.

6. The combination as defined in claim 3 wherein the further system is a moment coefficient computer.

References Cited in the file of this patent

UNITED STATES PATENTS

| | | |
|---|---|---|
| 2,584,261 | Davis et al. | Feb. 5, 1952 |
| 2,636,285 | Fogarty et al. | Apr. 28, 1953 |
| 2,731,737 | Stern | Jan. 24, 1956 |